United States Patent

[11] 3,554,247

| | | | |
|---|---|---|---|
| [72] | Inventor | Arild Larsen | |
| | | Langley, British Columbia, Canada | |
| [21] | Appl. No. | 781,350 | |
| [22] | Filed | Dec. 5, 1968 | |
| [45] | Patented | Jan. 12, 1971 | |
| [73] | Assignee | MacMillan Bloedel Limited | |
| | | Vancouver, British Columbia, Canada | |

[54] APPARATUS FOR TRIMMING ARTICLES OF VARYING WIDTHS
13 Claims, 5 Drawing Figs.

[52] U.S. Cl.................................................. 144/117,
83/368
[51] Int. Cl.:.................................................. B27c 1/02
[50] Field of Search............................................. 144/117.2,
117, 13; 83/368; 143/168.6, 160, 37.2

[56] References Cited
UNITED STATES PATENTS
2,516,176  7/1950  Bjork........................... 144/117.2

| | | | | |
|---|---|---|---|---|
| 2,647,547 | 8/1953 | Gifford | ......................... | 144/13 |
| 2,830,629 | 4/1958 | Deiters | ......................... | 144/117.2 |
| 2,851,070 | 9/1958 | Hughes | ......................... | 144/117.2 |
| 2,914,100 | 11/1959 | Lindholm | ..................... | 143/160 |

*Primary Examiner*—Gil Weidenfeld
*Attorney*—Fetherstonhaugh & Co.

ABSTRACT: Automatic apparatus for trimming shingles, shakes, and other articles of varying widths to produce true sides thereon and including a carriage supporting a trimming head with means for moving the carriage towards and away from the path along which the articles are moved, a follower arm having an end biased towards the path and engaged by sides of the article moving therealong, said arm being shifted to a position determined by the width of the article engaged thereby and through an electrical system causing the carriage to be shifted to position the trimming head so as to be able to trim or make true the side of this article.

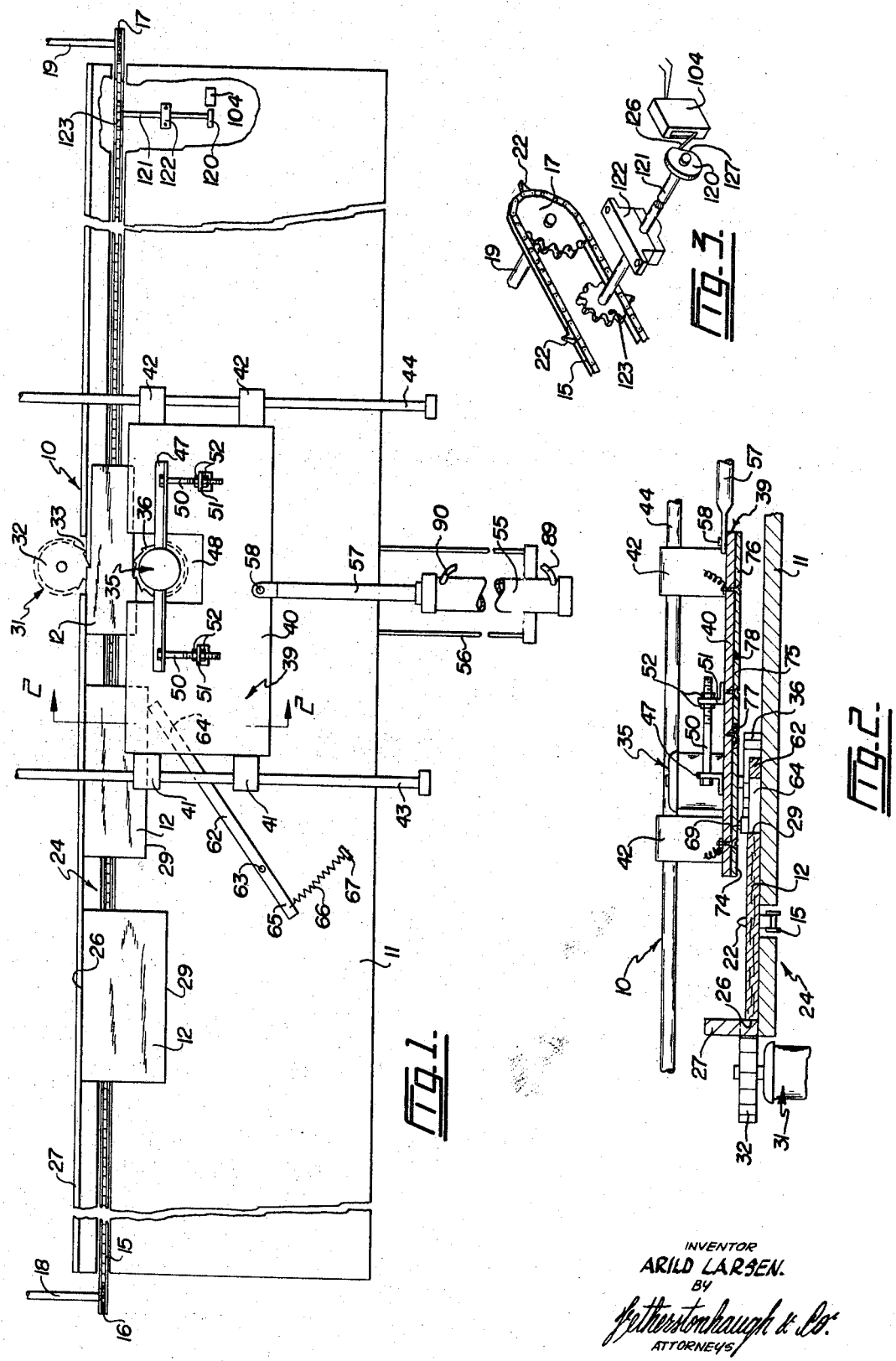

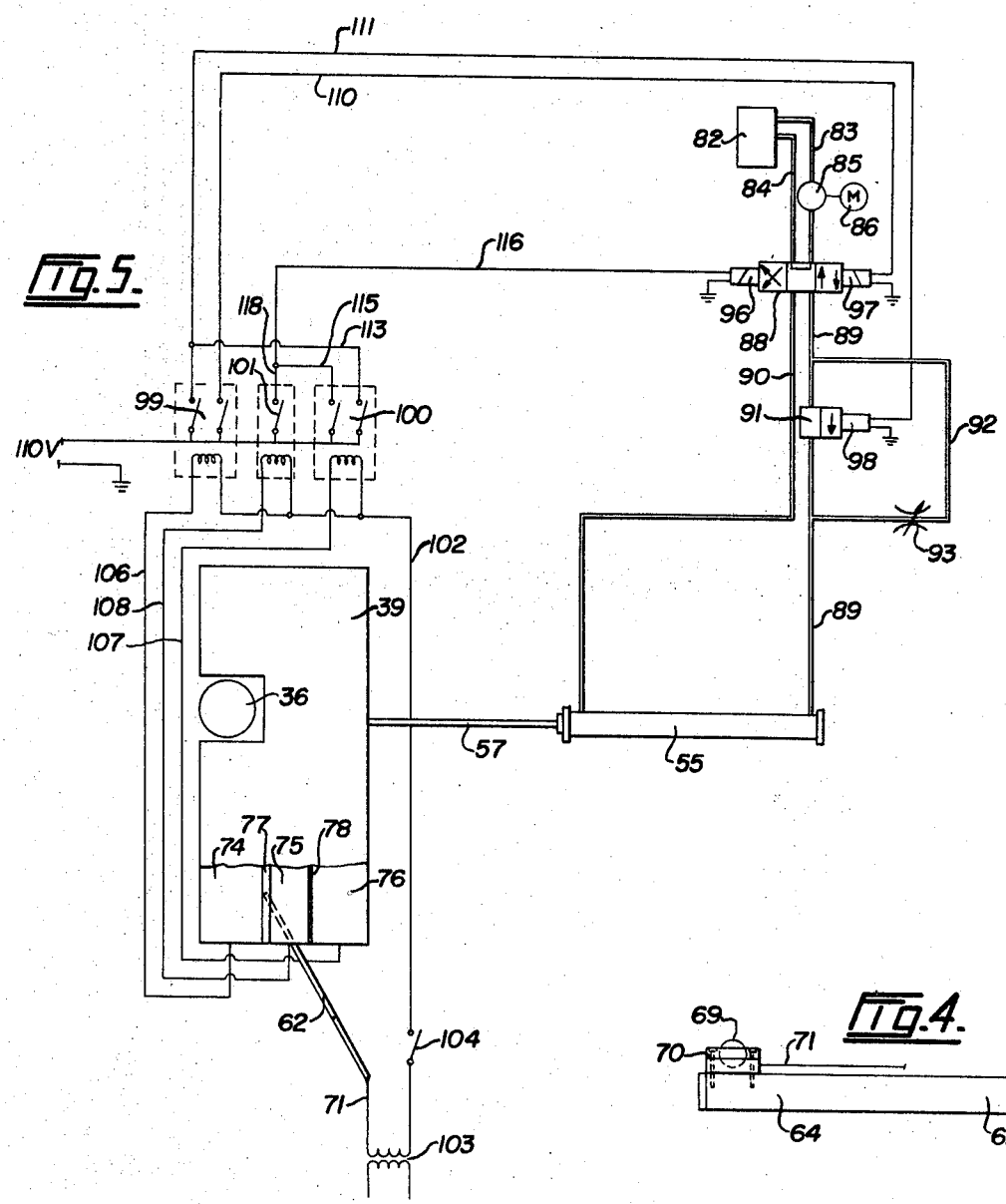

APPARATUS FOR TRIMMING ARTICLES OF VARYING WIDTHS

BACKGROUND OF THE INVENTION

This invention relates to automatic apparatus for trimming articles, such as shingles, shakes, and the like of varying widths to produce true sides thereon while removing a minimum of material from each of said articles.

Although this apparatus may be used for trimming different types of articles of varying widths, it will for the sake of convenience be described in connection with trimming shingles.

The trimming of shingles in the past has been essentially a manual operation. Each shingle was moved along a path by suitable conveying means between a stationary trimming head and an opposed trimming head which was mounted for movement towards and away from the stationary head. The operator shifted the movable head by means of a hand lever to a position to trim each shingle, and then the head was mechanically locked in position until the shingle moved between and past the two heads and was trimmed on opposite sides. The prior apparatus required the constant attention of an operator, and he sometimes trimmed off too much wood and other times, not enough. In the latter case, and if the side of the shingle was inclined relative to the general direction of movement thereof, the side would not be properly trimmed.

SUMMARY OF THE INVENTION

The main object of the present invention is to overcome the problems set out above. This apparatus is designed automatically to trim shingles and other articles of varying widths without constant attention. In addition, the apparatus trims off enough and only enough of the wood to make the shingle side true, that is, parallel to the general length of the shingle.

Apparatus according to the present invention includes a carriage at the side of a path along which the shingles are moved and mounted for movement towards and away therefrom, and power means connected to the carriage operable selectively to move it towards and away from the path. The shingle is usually moved along a fence as it travels over the path. A conveyor moves the articles along the path past a trimming head mounted on the carriage. A swingably mounted follower arm ahead of the trimming head, with reference to the direction of movement of the shingles, has an end biased towards the path, and an electrical contact is mounted on the arm near said end. A switch is operated after each shingle has engaged the arm and has moved a predetermined distance thereafter. Electrical circuit means including this switch and the contact is adapted to operate the power means to shift the carriage and to cause the trimming head thereon to trim the shingle to a width determined by the position of said arm end.

This apparatus also includes first and second contact plates on the carriage and forming part of the circuit means, said arm contact engaging the first plate when the arm swings towards the path to cause the carriage to move in the same direction and engaging the second plate when swinging away from said path to cause the carriage to move away therefrom.

Each shingle swings the follower arm to a position determined by the width of the shingle, and when the shingle ahead of the one engaged by the arm is clear of the trimming head, the switch is operated to cause the carriage to be shifted to position the trimming head to trim the next shingle to true the side thereof. As soon as the shingle clears the follower arm, the latter either swings to a position in the path ready for the next shingle or is engaged by the next shingle, in which case the operation in is repeated.

BRIEF DESCRIPTION OF THE DRAWINGS

FIG. 1 is a plan view of trimming apparatus according to the present invention;

FIG. 2 is an enlarged section taken on the line 2–2 of FIG. 1;

FIG. 3 is a fragmentary perspective view of a portion of the apparatus, showing means for operating the switch;

FIG. 4 is an enlarged view of the end of the follower arm; and

FIG. 5 is a wiring diagram of one form of electrical circuit means and power means for this apparatus.

DESCRIPTION OF THE PREFERRED EMBODIMENTS

Referring to the drawings, 10 is apparatus according to the present invention and including a support or table 11 over which articles of varying widths, such as shingles 12, are moved in any suitable manner, such as by a conveyor consisting of a chain 15 extending around sprockets 16 and 17 at opposite ends of the table and mounted on shafts 18 and 19, one of which is driven by a suitable source of power, not shown. Chain 15 has lugs 22 projecting outwardly therefrom and spaced apart a distance greater than the length of shingles 12. The upper run of chain 15 is located so that lugs 22 project above the upper surface of table 11, as clearly shown in FIG. 2. These lugs move shingles 12 along a path 24 over the top of the table.

As each shingle 12 is moved along path 24, its side edge 26 bears against a fence 27 projecting upwardly from table 11 and extending beside the path. As shingles 12 are of varying widths, their opposite edges 29 are located at different distances from fence 27, and it is these variations in width that make it difficult automatically to trim shingles.

Although the edges 26 of the shingles may be trimmed or trued before the shingles reach apparatus 10, it is preferably to do this at the same time as opposite edges 29 are trimmed or trued. In this embodiment of the invention, a standard trimming unit 31 having a rotary head 32 is positioned to trim shingle edges 26 as the shingles move along path 24. Head 32 projects through a gap 33 in fence 27 so as to trim the shingles moving along the path.

Another standard trimming unit 35 having a rotating head 36 is mounted opposite unit 31 and on the opposite side of path 24, and is movable towards and away from the path in order to trim the edges 29 of the shingles in accordance with the widths of the latter.

In this example, trimmer 35 is adjustably mounted on a carriage 39 which is slidably supported in any convenient manner. For example, carriage 39 consists of a deck 40 having bearings 41 and 42 projecting from opposite ends thereof slidably mounted on supporting rods 43 and 44, said rods being supported in any suitable manner above table 11 and extending above and across path 24. The trimmer unit 35 is carried by a bar 47 which extends across an opening 48 in carriage deck 40. The trimmer unit is located above opening 48 so that head 36 is in the same horizontal plane as shingles 12 on table 11. Bar 47 is movable on deck 40, and is connected to bolts 50 which extend through brackets 51 mounted on and projecting upwardly from the deck. Nuts 52 adjustably secure bolts 50 to brackets 51.

Suitable means is provided for shifting carriage 39 and, consequently, trimming head 36 towards and away from path 24. In this example, a hydraulic cylinder 55 is provided for this purpose. This cylinder is supported by a bracket 56 connected to table 11, and has a piston rod 57 projecting therefrom towards and connected to carriage 39 at 58.

A follower arm 62 is swingably mounted on table 11 by a pivot pin 63, and has an end 64 extending beneath carriage 39 and towards shingle path 24, and an opposite end 65 to which a spring 66 is connected, the opposite end of said spring being secured to a bracket 67 projecting upwardly from the table. This spring biases the end 64 of the follower arm towards the shingle path. An electrical contact is mounted on arm end 64, and in this example, the contact consists of a metal ball 69 rotatably mounted in and projecting upwardly from a socket in a mount 70 fixed to the upper surface of the arm, see FIG. 4. Contact 69 is connected in an electrical circuit in any convenient manner, such as by a wire 71.

At least two contact plates are mounted on the lower surface of carriage 39. In this example, contact plates 74, 75 and 76 are mounted on and insulated from the carriage. A neutral bar 77 is mounted on the carriage between plates 74 and 75, and is insulated from the carriage and from both of these plates. A very thin insulation strip 78 is positioned between plates 75 and 76. If desired, another contact plate (not shown) may be located between plate 74 and bar 77 and insulated from the former.

Spring 66 biases the end 64 of follower arm 62 so that said end is near conveyor chain 15, at which time the distance between the arm end and fence 27 is less than the width of the narrowest shingle to be trimmed in this apparatus. At this time, carriage 39 is positioned so that neutral bar 77 engages contact ball 69 of the arm. When a narrow shingle engages the follower arm, the latter is swung outwardly of the path, as shown in FIG. 1. Contact 69 at this time has been moved away from bar 77 and engages contact plate 75 of the carriage. When the shingle has travelled a predetermined distance after first engaging the arm, suitable timing mechanism energizes an electrical system which shifts carriage 39 outwardly until contact 69 is again engaged by neutral bar 77 which deenergizes the circuit. At this time, trimming head 36 is positioned to trim the edge 29 of the shingle that has been engaged by the follower arm. The carriage is locked in this position until that shingle has been trimmed. The amount of wood trimmed off the shingles depends upon the position of the trimming head on the carriage relative to contact ball 69 when the latter is engaging the neutral bar. The position of the head may be adjusted by means of bolts 50 and nuts 52. Lugs 22 are spaced on conveyor chain 15 so that while one shingle is being trimmed, the next shingle has engaged follower arm 62 and is setting the apparatus for adjustment to the width of that next shingle.

If the shingle engaging arm 62 is relatively wide, the arm is swung outwardly by the shingle and contact 69 engages plate 76. When the electrical system is energized, the carriage is moved outwardly until arm contact 69 engages the neutral bar. Contact plate 75 is not absolutely necessary, but it has been fitted in the system so that when the follower are arm contact engages it, the movement of the carriage is slowed down, and this prevents the carriage from overshooting when it is moved outwardly.

When the next shingle is relatively narrow, the follower arm swings inwardly against the shingle and engages contact plate 74. When the electrical system is energized, the carriage is moved inwardly until the neutral bar engages contact 69.

Any suitable electrical circuit means may be used for controlling the movement of the carriage through cylinder 55. FIG. 5 illustrates an example of a circuit system suitable for this purpose, and a hydraulic system for the cylinder.

The hydraulic system for cylinder 55 includes a reservoir 82 and pressure and return lines 83 and 84. A pump 85 is mounted in pressure line 83, said pump being driven by an electrical motor 86. Lines 83 and 84 are connected to a standard electrically-operated control valve 88, from which lines 89 and 90 extend to the outer and inner ends respectively of cylinder 55, while line 89 goes through a standard electrically-operated, normally-closed control valve 91. A bypass line 92 extends around control valve 91 and is connected to line 89 on opposite sides of said valve, line 92 having a restriction 93 therein. Valve 88 has electrical control units 96 and 97 at opposite ends thereof, while valve 91 has an electrical control unit 98.

When control unit 97 of valve 88 is energized, the valve is operated to permit oil to travel from reservoir 82 through lines 83 and 89 to the outer end of cylinder 55, and return oil to travel from the inner end of said cylinder through lines 90 and 84 back to the reservoir. When unit 98 is energized, valve 91 is opened to permit oil to travel through line 89.

The electrical system for apparatus 10 includes double relay switches 99 and 100 and a single relay switch 101. The relay of switches 99, 100 and 101 are connected by a common wire 102 to a suitable low voltage electrical source, such as a transformer 103, to which wire 71 of the follower arm is connected. A control switch 104 in wire 102 controls the flow of current to the relays. The relays of switches 99, 100 and 101 are connected by wires 106, 107 and 108 to contact plates 74, 76 and 75, respectively. Switches 99 are connected by wires 110 and 111 to control units 97 and 98 of valves 88 and 91, respectively. One of the switches 100 is connected by wires 113 and 111 to unit 98, while the other of said switches is connected by wires 115 and 116 to control unit 96 of valve 88. The switch 101 is connected to wires 115 and 116 by wire 118.

Control switch 104 can be operated in any desired manner. For example, it can be located in path 24 so that it is operated by a shingle or the conveyor lug moving the latter along the path when said shingle clears the trimming head. In the illustrated example of the invention, switch 104 is operated by a cam 120 fixedly mounted on a shaft 121 journaled in a bearing 122 secured to the undersurface of table 11, see FIGS. 1 and 3. A sprocket 123 fixedly mounted on shaft 121 meshes with and is rotated by chain 15. Switch 104 has an operating lever 126 which bears against the peripheral surface of cam 120, said surface having a flat section 127. When lever 126 engages the flat cam surface 127, switch 104 is closed, but when the lever bears against the remainder of the peripheral surface of the cam, the switch is open.

When contact 69 of follower arm 62 engages contact plate 74 of the carriage and after switch 104 is closed, switches 99 are closed causing control valve 91 to be opened and valve 88 to be set so that pump 85 can pump fluid from reservoir 82 through lines 83 and 89 to cylinder 55, and return oil travels through lines 90 and 84, thereby ejecting rod 57 to move carriage 39 inwardly relative to the shingle path 24. When neutral bar 77 engages arm contact 69, the electrical circuit is broken and switches 98 open. This result is also attained when switch 104 is opened. When contact 69 engages contact plate 76, switches 99 are closed, thereby opening control valve 91 and operating valve 88 to enable pump 85 to pump fluid from the reservoir through lines 83 and 90 to cylinder 55. This moves carriage 39 in the direction away from the shingle path. At this time, return oil flows from cylinder 55 through lines 89 and 84 back to the reservoir. The circuit is opened when contact 69 is engaged by neutral bar 77, thereby causing switches 99 to be opened. If contact plate 75 is present, when the carriage is moved outwardly as a result of contact 69 engaging contact plate 76, when said contact leaves the latter plate switches 99 are opened, but switch 100 is closed as a result of the contact engaging plate 75 to keep valve 88 in the same setting. This permits control valve 91 to close so that the return oil in line 89 must travel through bypass line 92 and restriction 93 on its way back to the reservoir. This slows down the movement of carriage 39 and prevents overriding of the carriage when it is moving outwardly. The tendency to override exists particularly when the follower arm is in its innermost position and is engaged by a relatively wide shingle. If there is no shingle following the very wide one, arm 62 swings inwardly to its innermost position, and the carriage will shift inwardly when switch 104 is closed. However, it is not too important to prevent overriding of the carriage at this time, but if it is desired to prevent overriding on the inward movement of the carriage, a plate similar to plate 75 can be inserted between contact plate 74 and neutral bar 77. This additional contact plate would be electrically connected to the relay of switch 100. The The operation of apparatus 10 is obvious from the above. If the shingle engaging arm 62 is relatively narrow, contact 69 engages plate 74, and when switch 104 is closed by cam 120, the carriage is moved inwardly until the contact is engaged by neutral bar 77. If a wide shingle swings arm 62 outwardly, contact 69 engages plate 76, and when switch 104 is closed, the carriage is moved outwardly until the contact is engaged by the neutral bar. The movement of arm 62 sets the apparatus up for shifting carriage 39 and trimming head 36 in accordance with the width of the shingle engaged by said arm, but nothing happens until cam 120 operates switch 104, and this takes place when the shingle ahead of the one engaging the follower arm clears the trimming head.

I claim:

1. Automatic apparatus for trimming articles, such as shingles and shakes, of varying widths to produce true sides thereon, comprising a carriage at the side of a path along which said articles are moved and mounted for movement towards and away therefrom, power means connected to the carriage operable selectively to move the carriage towards and away from the path, a trimming head mounted on the carriage, a conveyor for moving said articles along the path past the trimming head, a swingably mounted follower arm having an end biased towards the path and ahead of the trimming head with reference to the direction of movement of the articles, an electrical contact on the arm, a switch operated after said each article has engaged the arm, electrical circuit means including said switch and said contact adapted to operate said power means to shift the carriage and to cause the trimming head thereon to trim the article to a width determined by the position of said arm end, and separated first and second contact plates on the carriage and forming part of said circuit means, said arm contact engaging the first plate when the arm swings towards the path to cause the carriage to move in the same direction and engaging the second plate when swinging away from said path to cause the carriage to move away from the latter.

2. Automatic trimming apparatus as claimed in claim 1 including a third contact plate on the carriage between the first and second plates and forming part of said circuit means, and means for slowing the movement of the carriage away from the path when the third plate is engaged by the arm contact.

3. Automatic trimming apparatus as claimed in claim 1 in which said contact is a ball rotatably mounted on the arm.

4. Automatic trimming apparatus as claimed in claim 1 including a nonconducting strip between said plates to break the circuit means to stop the carriage movement when said strip engages the arm contact.

5. Automatic trimming apparatus as claimed in claim 4 in which said contact is in the form of a ball rotatably mounted on the arm.

6. Automatic trimming apparatus as claimed in claim 4 in which the power means comprises a fluid-operated cylinder having a connecting rod projecting therefrom and connected to the carriage, and means operated by said circuit means for selectively directing fluid under pressure to ends of the cylinder to move the piston therein.

7. Automatic trimming apparatus as claimed in claim 6 including first and second valves for controlling the flow of fluid to the opposite ends of the cylinder, electrical means forming part of said circuit means for operating the first valve and in circuit with the first contact plate, and electrical means forming part of said circuit means for operating the second valve and in circuit with the second contact plate.

8. Automatic apparatus for trimming articles, such as shingles and shakes, of varying widths to produce true sides thereon, comprising a carriage at the side of a path along which said articles are moved and mounted for movement towards and away therefrom, power means connected to the carriage operable selectively to move the carriage towards and away from the path, a trimming head mounted on the carriage, a conveyor for moving said articles along the path past the trimming head, a swingably mounted follower arm having an end biased towards the path and ahead of the trimming head with reference to the direction of movement of the articles, an electrical contact on the arm, a switch, means for operating said switch after said each article has engaged the arm and has moved a predetermined distance thereafter, electrical circuit means including said switch and said contact adapted to operate said power means before said each article reaches the trimming head and when said switch is operated to shift the carriage so that said trimming head when reached by said each article is in position to trim the latter to a width determined by the position of said arm end when the article had moved said predetermined distance.

9. Automatic trimming apparatus as claimed in claim 8 including separated first and second contact plates on the carriage and forming part of said circuit means, said arm contact engaging the first plate when the arm swings towards the path to cause the carriage when said switch is operated to move in the same direction and engaging the second plate when swinging away from said path to cause the carriage when said switch is operated to move away from the path.

10. Automatic trimming apparatus as claimed in claim 9 including a third contact plate on the carriage between the first and second plates and forming part of said circuit means, and means for slowing the movement of the carriage away from the path when the third plate is engaged by the arm contact.

11. Automatic trimming apparatus as claimed in claim 9 including a nonconducting strip between said plates to break the circuit means to stop the carriage movement when said strip engages the arm contact.

12. Automatic trimming apparatus as claimed in claim 11 in which the power means comprises a fluid-operated cylinder having a connecting rod projecting therefrom and connected to the carriage and means operated by said circuit means for selectively directing fluid under pressure to ends of the cylinder to move the piston therein.

13. Automatic trimming apparatus as claimed in claim 12 including first and second valves for controlling the flow of fluid to the opposite ends of the cylinder, electrical means forming part of said circuit means for operating the first valve and in circuit with the first contact plate, and electrical means forming part of said circuit means for operating the second valve and in circuit with the second contact plate.